Dec. 6, 1960 H. F. WILDER ET AL 2,963,550

STATION SELECTION REPEATER

Filed April 9, 1957 2 Sheets-Sheet 1

INVENTORS
H. F. WILDER
H. F. KRANTZ II
BY E. R. Hyde Jr.
ATTORNEY

Dec. 6, 1960 H. F. WILDER ET AL 2,963,550

STATION SELECTION REPEATER

Filed April 9, 1957 2 Sheets-Sheet 2

INVENTORS
H. F. WILDER
H. F. KRANTZ II

BY E.R. Hyde Jr.
ATTORNEY

United States Patent Office 2,963,550

Patented Dec. 6, 1960

2,963,550

STATION SELECTION REPEATER

Harold F. Wilder, Wyckoff, N.J., and Hubert F. Krantz II, Huntington Station, N.Y., assignors to The Western Union Telegraph Company, New York, N.Y., a corporation of New York Filed Apr. 9, 1957, Ser. No. 651,642

11 Claims. (Cl. 178—71)

The present invention relates to printing telegraphy and more particularly to a telegraph system employing start-stop teleprinter stations as well as multiplex stations.

The conventional teleprinter system includes a series of stations each equipped with a teleprinter for start-stop transmission and reception. Each of the stations may be interconnected by lines to main offices of a system such as that maintained by the Western Union Telegraph Company. The customer leasing the lines has exclusive use of the facilities connecting each station and when none of the various offices or stations has a message to send, the line stands idle and the teleprinter motor at each customer station is turned off. During this idle period, a mark condition exists on the lines connecting the stations. With this steady mark condition on the lines, the teleprinter motor at each station is turned off.

When an operator at one of the telegraph stations wants to send a message, he will press a call button which applies a spacing pulse to the line. This pulse is timed and will last for approximately five seconds. All the lines of the system will open during this period causing the teleprinter motor at each station to start running in a well-known manner. At the end of the 5-second interval, with the motors running, each station is prepared to receive and the operator at the sending station will thereupon send the call letters of the station called and the call letters of the calling station. These two printers will thereupon lock in and the remaining stations will drop out. Transmission of the message can then take place employing the conventional start-stop system.

Since this start-stop telegraph system fails to make maximum use of the line facilities, it has been known to employ a multiplex channel or link so that a number of units can employ the same line facilities. As is well known, a multiplex system employs the conventional five pulse code, as distinguished from the start-stop system wherein a start pulse and a rest pulse is employed in sending each character. The multiplex system transmits spacing pulses during idle periods which is the opposite from the start-stop printer-to-printer system wherein a mark condition exists on the line during idle periods and a 5-second space condition is employed to prepare the distant stations for reception.

It is seen then in a system employing a plurality of both start-stop printer links and multiplex stations, that a problem exists due to the fact that each employs a different idle condition so that it is not possible to send the usual 5-second space signal to alert the receiving teleprinters for reception of the call letters to be sent. As a result, the sending stations are required to omit the sending of the alert signal and send the call letters directly without a prior alert signal. This is most disadvantageous since the call letters of the called station are sent at a time when the receiving teleprinter motors are all stopped. If any of the initial call letters are missed because the receiving teleprinters have not been previously alerted, the subsequent message will be misdirected or may not be received by any teleprinter at all. This is a most undesirable condition.

The present invention is directed at making it possible to send a timed spacing signal through the multiplex link to alert all the teleprinters for reception of the call letters.

Accordingly, a primary object of the present invention is to provide an improved telegraph system employing both start-stop stations and multiplex stations.

Another object of the present invention is to provide a telegraph system having both start-stop telegraph stations and multiplex stations wherein means is provided at a multiplex station to detect special alerting signals from a start-stop station.

Another object of the present invention is to provide a start-stop and multpilex system wherein a special alerting signal from a start-stop sending station is detected and passed on to the receiving start-stop stations in the system.

Another object of the present invention is to provide a station selection repeater adapted to be used at a multiplex telegraph station to detect special alerting line conditions on an incoming line and to pass the condition onto an outgoing line.

As used throughout the specification and claims, the terms "mark" and "space" refer to two opposite electrical conditions. In the telegraph art the term "mark" generally refers to a negative battery on a line or a closed line, while "space" customarily refers to a positive battery or open line. In a carrier system these terms will refer to two different modulation frequencies. However, in practice it sometimes occurs that a mark condition will be positive battery while a space will represent negative battery. Therefore, the present specification uses these terms, "mark" and "space," in their broad sense as representing any two different electrical conditions selectively used to transmit intelligence. Also, the term "line" as used throughout the specification and claims is intended to include any connecting facility between telegraph stations such as wires, cables or radio channels.

In accordance with the above and other objects of the invention, a telegraph system is provided that comprises a plurality of interconnected teleprinter stations having at least one section or link of the system multiplexed. When an operator at one of these teleprinter stations desires to transmit, he will open or space the line for a 5-second interval in the conventional manner for direct start-stop transmitter to start-stop receiver telegraphy. This space or open condition is detected at the connected multiplex stations by the selection repeater of the present invention. Upon detecting the 5-second space condition the selection repeater will thereupon cause the multiplex channel to transmit the "letters" character which comprises five mark pulses. These mark pulses will be transmitted to the connected multiplex station whereupon they will be detected by another selection repeater which will in turn open the line to the connected teleprinter station. It is seen then that the timed space signal from the station initiating transmission will in effect be transmitted through the multiplex section or link to other connected teleprinter stations where it will appear as a timed space pulse. This space condition will serve to operate the teleprinter motor at the receiving stations in the conventional manner. At the end of this interval all of the stations on the line will be prepared to receive and the transmitting operator can thereupon send the code letters of the receiving station.

The invention will be more fully understood from the following description of a specific embodiment thereof taken with the drawings in which—

Figures 1, 2:
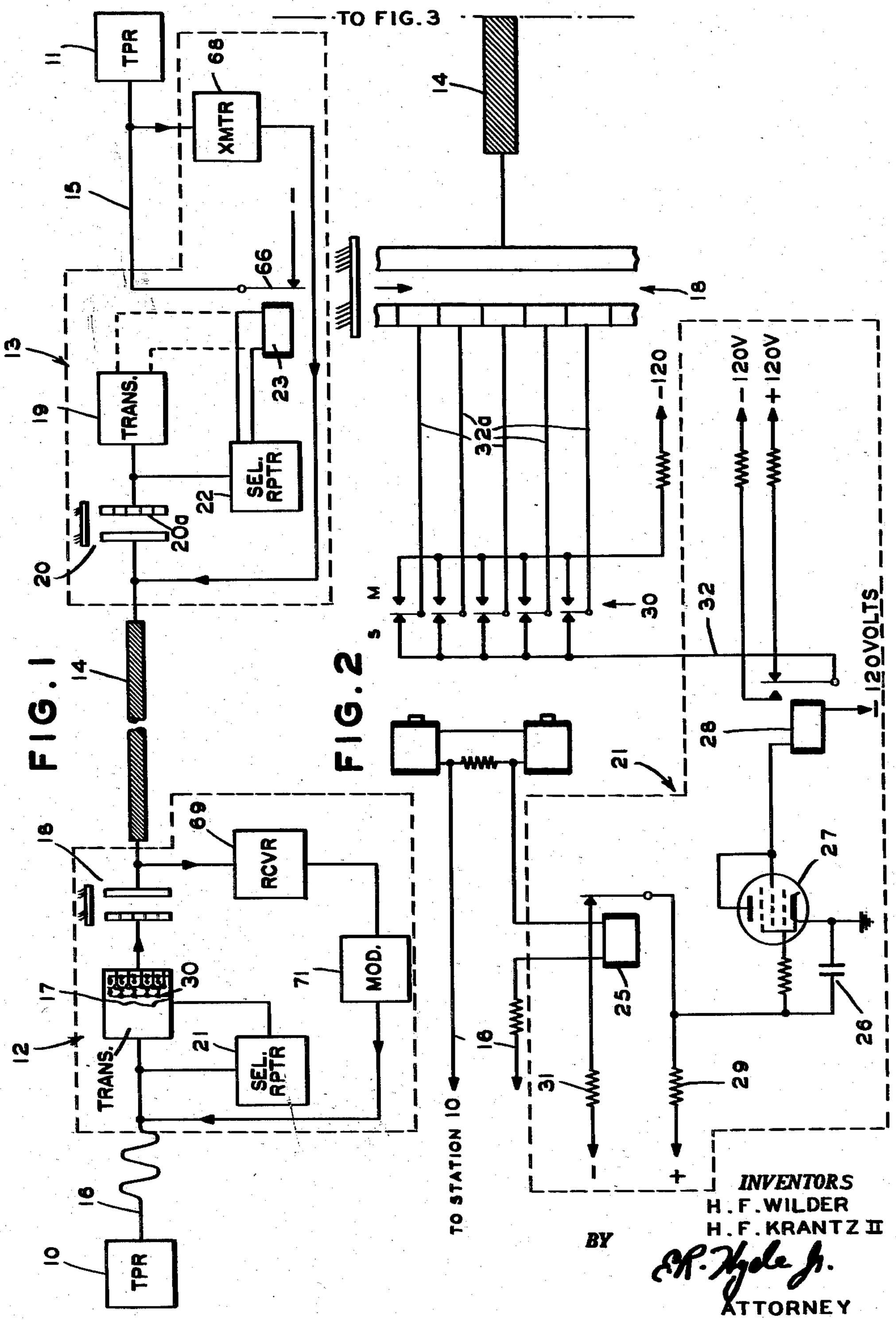
Fig. 1 is a schematic illustration of a system employing the station selection repeater of the present invention.
Fig. 2 is a schematic diagram of the elements of the selection repeater and a portion of the printer-to-multiplex translator at the multiplex sending end.

Referring now to Fig. 1, there is shown by way of example a system having teleprinter stations 10 and 11 and multiplex stations 12 and 13. Stations 10 and 11 are distantly located and may represent stations of a customer leasing facilities and services of a telegraph company. Stations 12 and 13 may represent distantly located offices of the telegraph company. In describing the operation of the system it will be considered that transmission is from station 10 to station 11 and therefore for purposes of illustration, station No. 10 will be referred to as the sending station and station 11 the receiving station. Station 10 may be connected by a carrier 16 to multiplex station 12 which in turn is connected by cable 14 to multiplex station 13. If the distance between station 13 and 11 is short, the connection may be a direct line 15. Other printer stations may be connected to either stations 10 or 11, however, it is not necessary to show these for the purposes of the present description.

It is understood, of course, that the teleprinter stations 10 and 11 operate on a start-stop system employing a 7-unit code in which a start pulse is transmitted at the beginning of each 5-unit character and a rest pulse representing a marking condition terminates each character. The multiplex stations on the other hand employ the 5-unit code and operate continuously. This incompatibility between the start-stop system and the 5-unit code of the multiplex system is resolved by means of a printer-to-multiplex translator 17. This unit is of conventional construction and may be of the type shown in U.S. Patent No. 1,880,906. For purposes of the present description, it need only be noted that this translator includes a reperforator which receives the characters from the sending station 10 and stores them on a tape. This tape is fed to a tape transmitter which in turn connects to the sending rings of a multiplex face plate 18. Thus the characters are transmitted over cable 14 where they are received at station 13 at multiplex face plate 20 and passed to a multiplex-to-printer translator 19 which is also of known construction. This unit will translate the 5-unit multiplex code to a 7-unit start-stop code to be transmitted to station 11. For the details of construction of the multiplex-to-printer translator reference may be had to U.S. Patent No. 2,196,069 of F. G. Hallden.

During the normal or idle condition of the system, lines 15 and 16 are in the closed or mark condition. With this mark condition on line 16, the translator 17 will send the blank character which is represented by 5-space or positive pulses. When the operator at station 10 initiates transmission by sending a 5-second space pulse, the reperforator within the translator 17 would normally commence feeding tape and send space pulses representing the blank space character which would be ineffective to change the transmission condition of multiplex translator 19. However, the present invention contemplates provision of a selection repeater 21 at station 12 which will detect the space condition on line 16 and cause the letters character which comprises 5 mark pulses to be passed to the sending rings 18 and transmitted over cable 14 at station 13. The letters character received at station 13 is detected by a selection repeater 22 which serves to energize an output relay 23 to open line 15. Thus the line to station 11 is placed in the open or space condition in response to the timed space pulse from station 10. The open line 15 will cause the teleprinter motor at station 11 to energize in preparation for receiving intelligence characters.

Reference will now be made to Fig. 2 in considering the operation of the receiving mechanism of selection repeater 21. A signal relay 25 is inserted in series with the line 16. During the idle or marking condition on the line this relay will remain energized thereby allowing a biasing condenser 26 of tube 27 to charge to a negative potential or bias through a low resistance 31. The resulting negative bias on the condenser cuts off the tube 27 to maintain transmitter control relay 28 in a deenergized condition. With this control relay thus deenergized a positive potential, for example 120 volts, is applied through its contacts and wire 32 to the spacing (S) contacts 30 of the tape transmitter of the printer-to-multiplex translator 17. Positive battery is then applied to rings 18 via wires **32*a*. This is the normal condition of the circuit and spacing pulses will pass through the sending rings 18 over cable 14** which is the normal condition for a multiplex line as previously discussed.

When the customer at station 10 opens his line by sending a five-second spacing signal to initiate transmission, relay 25 will deenergize thereby permitting biasing condenser 26 to charge to positive battery through a resistor 29. This resistor is of a substantially higher resistance than resistor 31 connected to negative battery. For example, resistor 29 may be of the order of one-half a megohm while resistor 31 may be of 1000 ohms. In this way a time delay of approximately one-half second is provided so that condenser 26 will only charge positively during an extended period of deenergization of relay 25. Thus the usual spacing impulses received over line 16 during message transmission will be ineffective to charge condenser 26 to the conduction point of tube 27.

With relay 25 in its deenergized condition during the long open or spacing period, tube 27 will conduct to energize control relay 28. As this relay pulls up, its contacts will transfer to apply a negative battery over wire 32 to the spacing (S) contacts 30 of the printer-to-multiplex translator 17. This negative battery is passed through wires **32*a* to the segments of sending rings 18 and marking pulses then pass over cable 14. It is seen then that the timed five-second open condition from the customer's station 10 will be detected by repeater 21 and passed to cable 14** as a mark condition or string of "letters" characters.

This string of letters characters representing a mark condition must be detected at the receiving station 13 and passed on as a long space or open condition on the line 15 to station 11. Also this mark condition must be distinguished from the brief letters characters that are sent during normal message transmission. The apparatus for accomplishing this is shown in detail in Fig. 3. The signals from the multiplex face plate 20 are passed on to the multiplex-to-printer translator 19 through the resistors 34 and wires 33 connected to the respective receiving segments **20*a*. A transformer 36 is provided having five primary windings 35 each of which is connected across a respective resistor 34. The secondary winding 37 of transformer 36 connects to a trigger circuit generally indicated by numeral 38. A twin triode tube 39 has its grids 45, 48 connected through resistors 41 and 42 to opposite ends of the transformer secondary 37. The plate 43 connects through resistor 44 to the grid 45 of the tube and the plate 46 connects through resistor 47 to the grid 48. A plate supply 49 connects through resistors 51 and 52 to plates 43 and 46, respectively. The output of the trigger circuit is taken at plate 46 and connects by wire 53 to a neon tube 54. The transformer 36 is so wound that positive potential on the upper end of a primary winding 35 will reflect in the secondary 37** with the positive potential being at the top with respect to the bottom.

Considering now the receipt of the letters character or a mark pulse on the multiplex receiving segments **20*a*, the top of the secondary winding will be negative with respect to the bottom. Thus the upper part of tube 39 will be biased to cut off while the bottom part will conduct. In this condition plate 43 will be at a relatively high potential while plate 46 will be relatively lower. The low potential on plate 46 is passed by wire 53 to the neon tube 54 which will become nonconductive. A control tube 55 is provided, the grid of which connects through resistors 56 and 57 to the neon tube 54. Grid bias is supplied by a negative potential source indicated at 58. With the neon tube nonconductive due to the mark condition on the line, the control tube 55 will be biased to cut off thereby permitting a capacitor 59 to be charged through resistor 61 by a source P of positive potential. The RC circuit of capacitor 59 and resistor 61 provides a time delay for a second control tube 62. As the capacitor charges, the grid of the second control tube will become more positive until the tube commences to conduct. The purpose of the time delay is to distinguish between the occasional receipt of a letters character and the long mark condition at the start of transmission. When control tube 62 conducts, a relay 63 connected in the plate circuit thereof will energize to close its make contacts. This will energize the output relay 23 which may take the form of a polar relay having a biasing winding 65. Thus the contacts of relay 63 serve to short-circuit the winding 23*a*, 23*b* of relay 23 to cause its contacts 66 to open. When these contacts open the line 15 to the teleprinter at station 11** is opened which represents the long or timed space condition at the start of transmission.

The receipt of a space pulse or positive condition on any of the receiving segments of the multiplex distributor 20 will reverse the polarity of a primary winding 35 and of the secondary winding 37 of transformer 36. This is sufficient to reverse the trigger circuit 38 so that the upper section of tube 39 will conduct and the lower section will cut off. In this condition the plate 46 will assume a higher potential which will be passed through wire 53 to the neon tube 54. This tube will thereupon fire to cause the grid 55' of control tube 55 to become more positive until it conducts to provide a discharge path for capacitor 59. Control tube 62 will thereupon cut-off causing relay 63 to deenergize to close the output line 15 through the closed contacts 66 of relay 23. It is seen then that any interruption in the continuous stream of letters characters or mark condition representing the timed open condition will close the line to the teleprinter station.

To summarize then, the present invention provides a selection repeater located at each multiplex station which detects the change in line condition characterized by a long open period or space condition from a connected start-stop station at the start of message transmission. The repeater converts the space condition to a mark condition. This mark condition is then passed on through the multiplex link where it is detected at the next multiplex station by another selection repeater and converted to a long open condition. The long open condition is then passed on to all other connected teleprinter stations 7-unit start-stop code to alert them for call letter transmission.

Figure 3:
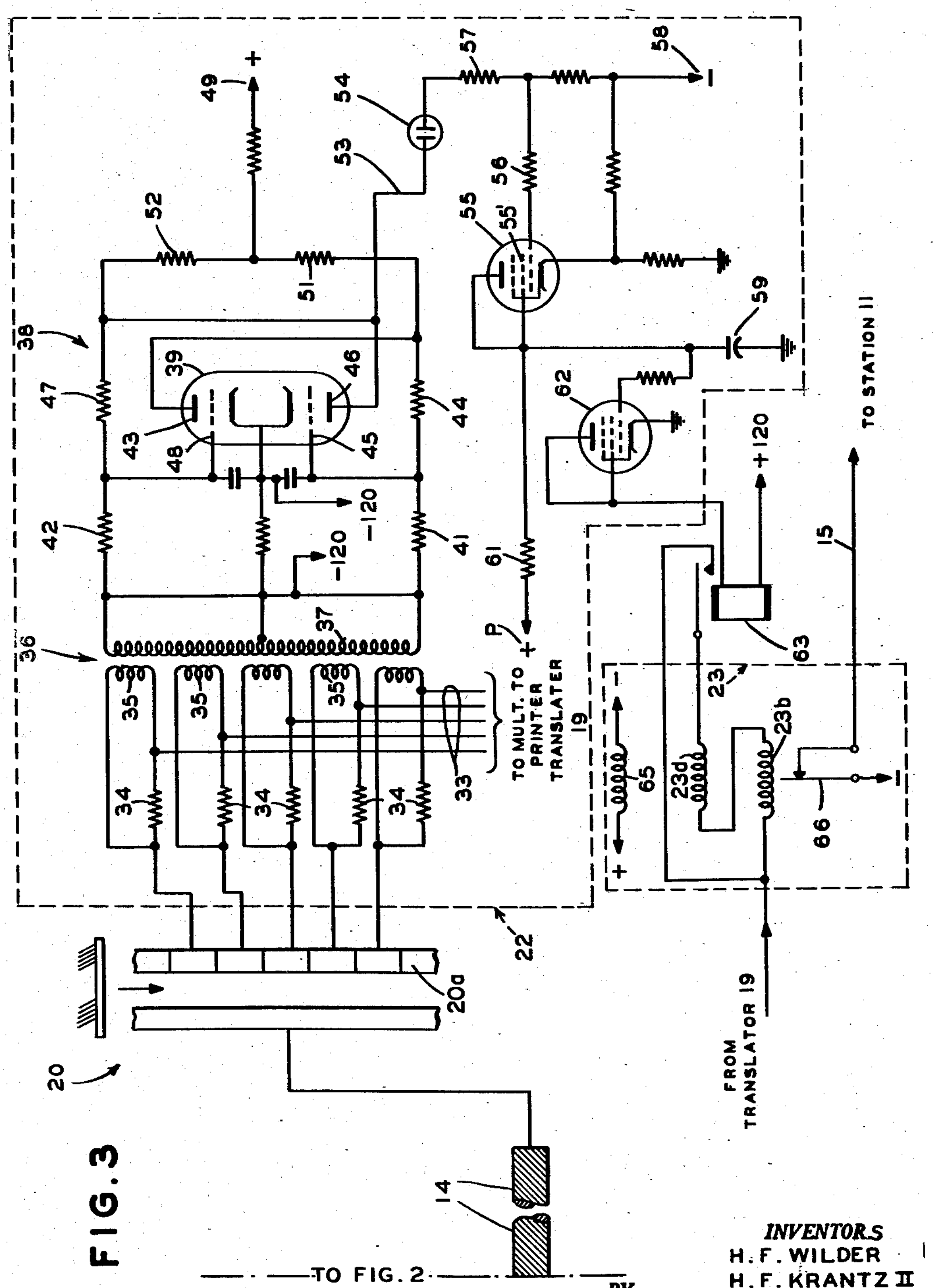
Fig. 3 is a schematic diagram of the elements of the selection repeater at the multiplex receiving end.

Though the invention has been so far described by reference to a system for transmitting messages in one direction such as from station 10 to station 11, it is of course understood that a commercial system would provide for two-way transmission. As seen in Fig. 1, numeral 68 generically represents the transmission equipment (XMTR) at station 13 for transmitting messages from station 11 to station 10. It is of course understood that this includes the conventional printer-to-multiplex translator and the multiplex sending distributor as well as the selection repeater elements of the present invention as shown in Fig. 2. Similarly, station 12 is equipped with a receiving apparatus (RCVR) including receiving multiplex faceplate, a multiplex-to-printer translator and selection repeater elements as shown in Fig. 3, all represented generically by block 69. Since the link 16 is herein shown as a carrier, a modulator (MOD) 71 is provided. It is seen then that each multiplex station is equipped with the selection repeater sending apparatus of Fig. 2 and the receiving apparatus of Fig. 3.

Though the present invention has been described with respect to a specific embodiment thereof, it is understood that it is not to be considered as limiting the invention as described in the appended claims.

What is claimed is:

1. A telegraph system of the character described comprising a plurality of connected telegraph stations, at least two of said stations being connected by a multiplex link, each multiplex station having a multiplex line characterized by an idle space condition, a first simplex line characterized by an idle mark condition, a first selection repeater connected to said multiplex line and first simplex line; said selection repeater comprising first detecting means connected to said first simplex line and responsive to a space condition of predetermined time duration, means connected to said first detecting means and responsive to actuation thereof to apply a mark pulse to said multiplex line, a second selection repeater connected to said multiplex line, said second selection repeater comprising a second detecting means, circuit means connected to said second detecting means and to a second simplex line and responsive to a mark pulse of said predetermined time duration over said multiplex line and means responsive to actuation of said circuit means to apply a space pulse having said predetermined time duration to said second simplex line.

2. A telegraph system of the character described comprising a plurality of connected telegraph stations, said stations including first and second multiplex stations connected by a multiplex link, said multiplex link characterized by an idle space condition, an incoming line connected to said first multiplex station and characterized by an idle mark condition, a selection repeater connected to said multiplex link and incoming line, said selection repeater comprising first detecting means connected to said incoming line and responsive to a space condition of predetermined time duration, means connected to said first detecting means and responsive to actuation thereof to apply a mark pulse to said multiplex link, second detecting means connected to said multiplex link at said multiplex station, an outgoing line connected to said second multiplex station, circuit means connected to said second detecting means and responsive to a mark pulse of predetermined length over said multiplex link and means including timing circuit means responsive to actuation of said circuit means to apply a space pulse of said predetermined time duration to said outgoing line.

3. A telegraph system of the character described comprising a plurality of connected telegraph stations, said stations including first and second multiplex stations being connected by a multiplex link, said first and second multiplex stations having a multiplex line characterized by an idle space condition, an incoming line connected to said first multiplex station and characterized by an idle mark condition, a selection repeater connected to said multiplex line and incoming line, said selection repeater comprising first relay means connected to said incoming line, electron discharge means connected to said first relay means, a timing circuit connected to the electron discharge means and to said first relay means whereby said electron discharge means is activated upon receipt of a space pulse of predetermined time duration over said incoming line, second relay means connected in the output circuit of said electron discharge means whereby activation thereof actuates said second relay means, means responsive to actuation of said second relay means to apply a mark pulse having said predetermined time duration to said multiplex line, detecting means connected to said multiplex line at said multiplex station, an outgoing line connected to said second multiplex station, circuit means connected to said detecting means and responsive to a mark pulse of predetermined time duration over said multiplex line and means including timing circuit means responsive to actuation of said circuit means to apply a space pulse to said outgoing line.

4. A telegraph system of the character described comprising a plurality of serially connected telegraph stations, said stations including first and second multiplex stations being connected by a multiplex link, said first and second multiplex stations having a multiplex line characterized by an idle space condition, an incoming line connected to said first multiplex station and characterized by an idle mark condition, a selection repeater connected to said multiplex line and incoming line, said selection repeater comprising first relay means connected to said incoming line, electron discharge means connected to said first relay means, a timing circuit connected to the electron discharge means and to said first relay means whereby said electron discharge means is activated upon receipt of a space pulse of predetermined time duration over said incoming line, second relay means connected in the output circuit of said electron discharge means whereby actuation thereof energizes said second relay means, means responsive to actuation of said second relay means to apply a mark pulse having said predetermined time duration to said multiplex line, transformer means connected to said multiplex line at said multiplex station, an outgoing line connected to said second multiplex station, trigger circuit means connected to said transformer means whereby a mark pulse of predetermined length over said multiplex line will actuate said trigger circuit means, means including timing circuit means responsive to actuation of said trigger circuit means to apply a space pulse to said outgoing line upon actuation of said trigger circuit means for a predetermined period of time.

5. A telegraph system of the character described comprising a plurality of serially connected telegraph stations, at least two of said stations being first and second multiplex stations connected by a multiplex link, said first and second multiplex stations being connected to a multiplex line characterized by an idle space condition and to an incoming line and outgoing line respectively each characterized by an idle mark condition, a selection repeater connected to said multiplex line and incoming line, said selection repeater comprising first relay means connected to said incoming line, vacuum tube means connected to said first relay means, a resistive-capacitive circuit connected to the grid of said tube and to said first relay means whereby said tube is rendered conductive upon receipt of a space pulse of predetermined time duration over said incoming line, second relay means connected in the plate circuit of said tube and adapted to be energized upon conduction thereof, means responsive to actuation of said second relay means to apply a mark pulse to said multiplex line, transformer means connected to said multiplex line at said second multiplex station, trigger circuit means connected to said transformer means whereby a mark pulse having said predetermined time duration over said multiplex line will actuate said trigger circuit means, means including timing circuit means responsive to actuation of said trigger circuit means to apply a space pulse to said outgoing line upon actuation of said trigger circuit means for said predetermined time duration.

6. A telegraph system having a plurality of at least four serially connected telegraph stations and wherein intelligence signals comprise first and second line conditions, a multiplex link connecting two intermediate stations of said system, the idle condition of said multiplex link being characterized by said first line condition, the idle condition of the other links being characterized by said second line condition, means at each of said multiplex stations responsive to a first line condition of predetermined time duration on an incoming line to apply a second line condition having said time duration to said multiplex link and means at each multiplex station responsive to a second line condition having said time duration received on the multiplex link to apply said first line condition for said time duration to the outgoing line.

7. A telegraph system having a plurality of at least four serially connected telegraph stations and wherein intelligence signals comprise mark and space pulses, a multiplex link connecting two intermediate stations of said system, the idle condition of said multiplex link being characterized by a space pulse condition, means at each of said multiplex stations responsive to a space pulse of predetermined time duration on an incoming line to apply a mark pulse to said multiplex link and means at each multiplex station responsive to a mark pulse of said predetermined time duration received on the multiplex link to apply a space pulse condition to the outgoing line for said time duration.

8. A telegraph system having a plurality of at least four serially connected telegraph stations and wherein intelligence signals comprise mark and space pulses, a multiplex link connecting two mean stations of said system whereby each multiplex station has a multiplex line and a simplex line connected thereto, the idle condition of said multiplex line being characterized by a space pulse condition, the idle condition of each simplex line being characterized by a mark condition, means at each of said multiplex stations responsive to a space pulse of predetermined time duration on the associated simplex line for said time duration to apply a mark pulse to said multiplex line and means at each multiplex station responsive to a mark pulse of said predetermined time duration received on the multiplex line to apply a space pulse condition to the associated simplex line for said time duration.

9. A device of the character described adapted to be used at a telegraph station having a first telegraph line and a second telegraph line connected thereto, said device comprising relay means adapted to be connected to said first line, means responsive to actuation of said relay means to apply a signal of predetermined time duration to said second telegraph line, transformer means having primary winding means adapted to be connected to said second telegraph line, trigger circuit means connected to the secondary of said transformer means, means whereby reception of a predetermined signal having said time duration on said second telegraph line actuates said trigger circuit, vacuum tube means and timing circuit means connected to said trigger circuit means whereby said vacuum tube means is actuated upon actuation of said trigger circuit means for said predetermined time duration, and means responsive to actuation of said vacuum tube means to open said first telegraph line.

10. A device of the character described adapted to be used at a telegraph station having a first telegraph line and a second telegraph line connected thereto, said device comprising relay means adapted to be connected to said first line, vacuum tube means, first timing circuit means interconnecting said relay means and vacuum tube means whereby energization of said relay means for a predetermined time duration of time renders said tube means conductive, means responsive to conduction of said vacuum tube means to apply a predetermined signal to said second telegraph line, means adapted to be connected to said second telegraph line, said last named means being responsive to a predetermined signal having said time duration on said second telegraph line to open said first telegraph line.

11. A device of the character described adapted to be used at a telegraph station having a first telegraph line and a second telegraph line connected thereto, said device comprising first relay means adapted to be connected to said first line, first vacuum tube means, first timing circuit means interconnecting said first relay means and first vacuum tube means whereby energization of said first relay means for a predetermined period of time renders said first tube means conductive, means responsive to conduction of said first vacuum tube means to apply a predetermined signal to said second telegraph line, transformer means including primary means adapted to be connected to said second telegraph line, trigger circuit means connected to the secondary of said transformer means, means whereby a reception of a predetermined signal on said second telegraph line actuates said trigger circuit, second vacuum tube means and second timing circuit means connected to said trigger circuit means whereby said second vacuum tube means is actuated upon actuation of said trigger circuit means for said predetermined period of time, and means responsive to actuation of said second vacuum tube means to open said first telegraph line.

References Cited in the file of this patent

UNITED STATES PATENTS

| | | |
|---|---|---|
| 1,461,645 | Benjamin | July 10, 1923 |
| 1,617,993 | Dudley | Feb. 15, 1927 |
| 1,677,121 | Hammond | July 10, 1928 |
| 1,880,906 | Duen et al. | Oct. 4, 1932 |
| 1,881,453 | Franklin | Oct. 11, 1932 |
| 1,917,195 | Noxon | July 4, 1933 |
| 2,283,381 | Maki | May 19, 1942 |

FOREIGN PATENTS

| | | |
|---|---|---|
| 603,298 | Germany | Oct. 3, 1934 |
| 832,760 | France | Oct. 3, 1938 |